United States Patent [19]
Murayama et al.

[11] Patent Number: 5,879,841
[45] Date of Patent: *Mar. 9, 1999

[54] METHOD FOR PREPARING MULTI-COMPOSED IMAGES WITHOUT USE OF A PHOTOCOMPOSER

[75] Inventors: Minoru Murayama; Hiromi Sakurai; Kazuyuki Matsuoka; Takanori Kitani, all of Kyoto, Japan

[73] Assignee: Dainippon Screen Mfg. Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 707,647

[22] Filed: Sep. 5, 1996

[30] Foreign Application Priority Data

Sep. 13, 1995 [JP] Japan ..................... 7-262326

[51] Int. Cl.⁶ ............... G03F 9/00; G03B 27/52
[52] U.S. Cl. ................. 430/22; 355/40; 355/54
[58] Field of Search ................. 430/22; 355/40, 355/54

[56] References Cited

U.S. PATENT DOCUMENTS 4,338,636  7/1982  Yamada et al. ................. 358/256
5,077,573  12/1991  Murayama et al. ................. 355/40

FOREIGN PATENT DOCUMENTS 0557008  8/1993  European Pat. Off. .
0613288  8/1994  European Pat. Off. .

*Primary Examiner*—Christopher G. Young
*Attorney, Agent, or Firm*—Ostrolenk, Faber, Gerb & Soffen, LLP

[57] ABSTRACT

A unit image area is specified, and unit image data representing a unit image in the unit image area is prepared. A plurality of the unit image areas are laid out on an image plane in a multi-composing manner, whereby layout information representing the multi-composing layout of the unit image areas is created. Mask data representing a plurality of multi-composed unit image areas are then prepared, based on the unit image area data and the layout information. Generated subsequently is an image recording signal representing unit images to be respectively drawn in the plurality of unit image areas, which are expressed by the mask data, on the image plane. Multi-duplicated images are eventually recorded on a photosensitive material according to the image recording signal without using a photocomposer.

4 Claims, 12 Drawing Sheets

ONE-PLANE VIEW

ONE-PLANE VIEW DATA

MULTI-COMPOSED DEVELOPMENT VIEWS

LAYOUT INFORMATION FILE

METHOD FOR PREPARING MULTI-COMPOSED IMAGES WITHOUT USE OF A PHOTOCOMPOSER

BACKGROUND OF THE INVENTION

1. Field of the Invention

The present invention relates to a method of and an apparatus for preparing multi-composed images by laying out identical images.

2. Description of the Related Art

Boxes and vessels made of paper sheets are called 'paper ware'. In many cases, various image are printed on the surface of a paper ware such as a photograph or illustration of a product, a trade name, and a bar code. In the process of color printing of images on paper wares, plural copies of a development view of the paper ware are laid out on an image plane corresponding to a photosensitive material, such as a presensitized plate, and respective color separation images are exposed from halftone films on the photosensitive material to produce printing plates for plural color inks. The reason why the development view of a paper ware is laid out in a multi-composing manner is that the development view is relatively small in general and that it is thus uneconomical to print only one image of the paper ware on a printing plate.

Photocomposers are conventionally used to lay out and expose a plurality of identical images on a photosensitive material. The photocomposer successively locates one original film, on which an original image of a paper ware is recorded, at each image position of multi-duplication and expose the original image on a photosensitive material at each image position, thereby recording a plurality of multi-composed images on one photosensitive material.

Recent advancement of computer technology enables an image, which is to be printed on a paper ware, to be prepared by an image processing system. This technology does not require the original film, but can prepare an original image with an image processing system and record image data representing the original image in a storage medium. Since the conventional method of preparing multi-composed images of a paper ware, however, expose an image on an original film on a photosensitive material, it is required to prepare an original film from the image data generated by the image processing system and expose multi-composed images with a photocomposer. Similar problems also arise in the process of preparing multi-composed images of labels.

SUMMARY OF THE INVENTION

Accordingly, an object of the present invention is to prepare multi-composed images without using a photocomposer.

The present invention is directed to a method of preparing multi-composed images by laying out identical images. The method comprises the steps of: (a) specifying a unit image area, in which a unit image is to be printed, to thereby generate unit image area data representing the unit image area; (b) generating unit image data representing the unit image within the unit image area; (c) laying out a plurality of copies of the unit image area on an image plane, to thereby generate layout information representing the layout of the plurality of unit image areas; (d) preparing mask data representing the plurality of unit image areas, based on the unit image area data and the layout information; and (e) generating an image recording signal representing a plurality of unit images to be reproduced in the plurality of unit image areas on the image plane as a function of the mask data and the unit image data.

The method prepares mask data representing a plurality of unit image areas based on the unit image area data and the layout information, and generates an image recording signal representing a unit image to be drawn on each of the multi-composed unit image areas expressed by the mask data. Accordingly, multi-composed images can be reproduced on a photosensitive material based on the image recording signal, thereby enabling multi-composed images to be produced without using a photocomposer.

In a preferred embodiment, the step (d) comprises the step of: preparing a register mark mask which is to be used in drawing a plurality of register marks at specific positions in the vicinity of each of the plurality of unit image areas so that the plurality of register marks do not overlap with the plurality of unit image areas; and the step (e) comprises the step of: generating the image recording signal representing the plurality of register marks as well as the plurality of unit images.

This method enables required register marks to be recorded in the vicinity of each multi-composed unit image.

The method further comprises the step of: (f) recording the plurality of unit images on a photosensitive material according to the image recording signal.

Preferably, the step (c) comprises the step of: preparing management number data as part of the layout information, the management number data representing different management numbers respectively drawn in the vicinity of the plurality of unit image areas; and the step (f) comprises the step of: recording the management numbers respectively in the vicinity of the plurality of unit image areas according to the management number data.

This method enables a management number to be allocated to each multi-composed unit image.

The present invention is also directed to an apparatus for preparing multi-composed images by laying out identical images. The apparatus comprises: means for specifying a unit image area, in which a unit image is to be printed, to thereby generate unit image area data representing the unit image area; means for generating unit image data representing the unit image within the unit image area; means for laying out a plurality of copies of the unit image area on an image plane, to thereby generate layout information representing the layout of the plurality of unit image areas; means for preparing mask data representing the plurality of unit image areas, based on the unit image area data and the layout information; means for generating an image recording signal representing a plurality of unit images to be reproduced in the plurality of unit image areas on the image plane as a function of the mask data and the unit image data.

The present invention is further directed to a computer readable medium having computer readable program code means embodied therein for preparing multi-composed images by laying out identical images. The computer readable program code means comprises: program code means for specifying a unit image area, in which a unit image is to be printed, to thereby generate unit image area data representing the unit image area; program code means for generating unit image data representing the unit image within the unit image area; program code means for laying out a plurality of copies of the unit image area on an image plane, to thereby generate layout information representing the layout of the plurality of unit image areas; program code means for preparing mask data representing the plurality of unit image areas, based on the unit image area data and the layout information; and program code means for generating an image recording signal representing a plurality of unit images to be reproduced in the plurality of unit image areas on the image plane as a function of the mask data and the unit image data.

These and other objects, features, aspects, and advantages of the present invention will become more apparent from the following detailed description of the preferred embodiments with the accompanying drawings.

DESCRIPTION OF THE PREFERRED EMBODIMENT

A. Structure of Apparatus

Figure 1:
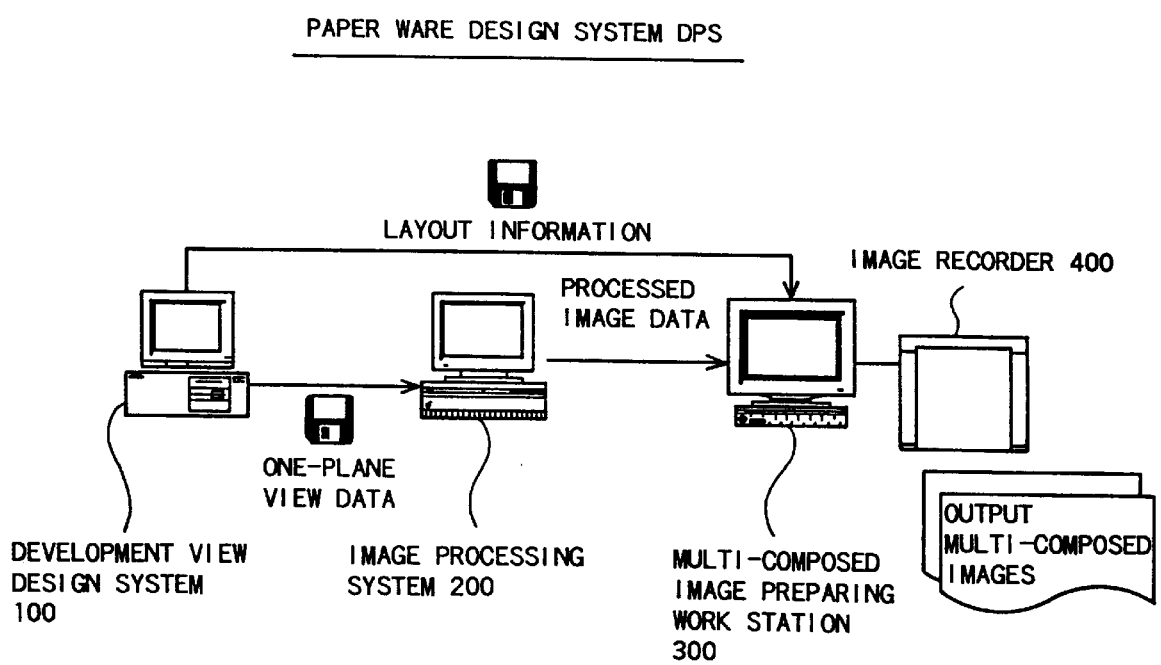
FIG. 1 conceptually illustrates a paper ware design system for preparing multi-composed images of a paper ware embodying the present invention.

FIG. 1 conceptually illustrates a paper ware design system DPS for preparing multi-composed images of a paper ware embodying the present invention. The paper ware design system DPS includes a development view design system 100, an image processing system 200, a work station 300 for preparing multi-composed images, and an image recorder 400.

The development view design system 100 is a computer system functioning to produce a development view of a paper ware and lay out plural copies of the development view on an image plane corresponding to a photosensitive material. The development view design system 100 generates one-plane view data representing a development view of a paper ware as well as layout information representing position and orientation of each multi-composed image.

The image processing system 200 is a computer system functioning to prepare a color image (or unit image) including a photograph or illustration of a product, a trade name, and a bar code, which are to be printed on the surface of the paper ware, and generate color separation image data of the color image. Four color separation image data are generally prepared corresponding to four primary color inks of Y (yellow), M (magenta), C (cyan), and K (black). In the process of preparing an image of a paper ware, it is required to locate the image within a fixed area of the development view of the paper ware. The image processing system 200 accordingly specifies a unit image area, in which an image is printed, on the basis of the one-plane view data (representing the development view) given by the development view design system 100 and produces a unit image within the unit image area. The image of the paper ware thus prepared by the image processing system 200 is hereinafter referred to as 'processed image' or 'unit image', and the image data representing the image of the paper ware as 'processed image data' or 'unit image data'.

The multi-composed image preparing work station 300 is a computer system functioning to generate an image recording signal representing multi-composed images, according to the layout information supplied from the development view design system 100 and the processed image data supplied from the image processing system 200. The image recorder 400 records multi-composed images on a photosensitive material, such as a photosensitive film and a presensitized plate, based on the image recording signal given by the multi-composed image preparing work station 300. The image recording signal is generated for each color separation image, and the multi-composed images are thus recorded for each color separation image.

Figure 2:
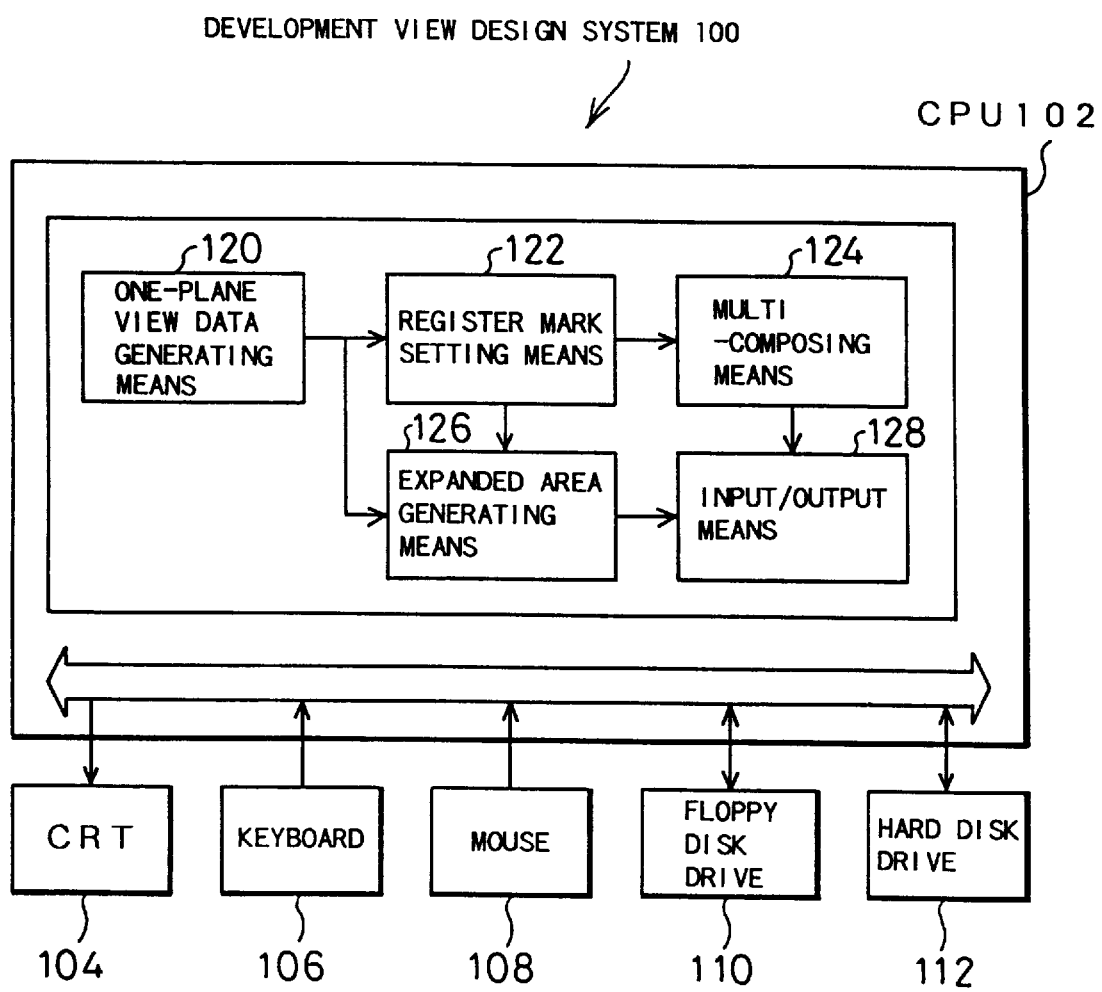
FIG. 2 is a block diagram illustrating the structure of a development view design system 100.

FIG. 2 is a block diagram illustrating the structure of the development view design system 100. The development view design system 100 includes a CPU 102, a color CRT 104 working as display means, a keyboard 106 and a mouse 108 as input means or specifying means, and a floppy disk drive 110 and a hard disk drive 112 as external storage means. The CPU 102 executes computer program codes stored in a main memory (not shown) to implement the functions of a one-plane view data generating means 120, a register mark setting means 122, a multi-composing means 124, an expanded area generating means 126, and an input/output means 128.

The computer program codes for implementing the functions of these means are stored in a portable storage medium (carriable storage medium), such as a floppy disk or a CD-ROM, and transferred from the portable storage medium to the main memory or hard disk drive 112 of the computer system.

B. First Embodiment

Figure 3:
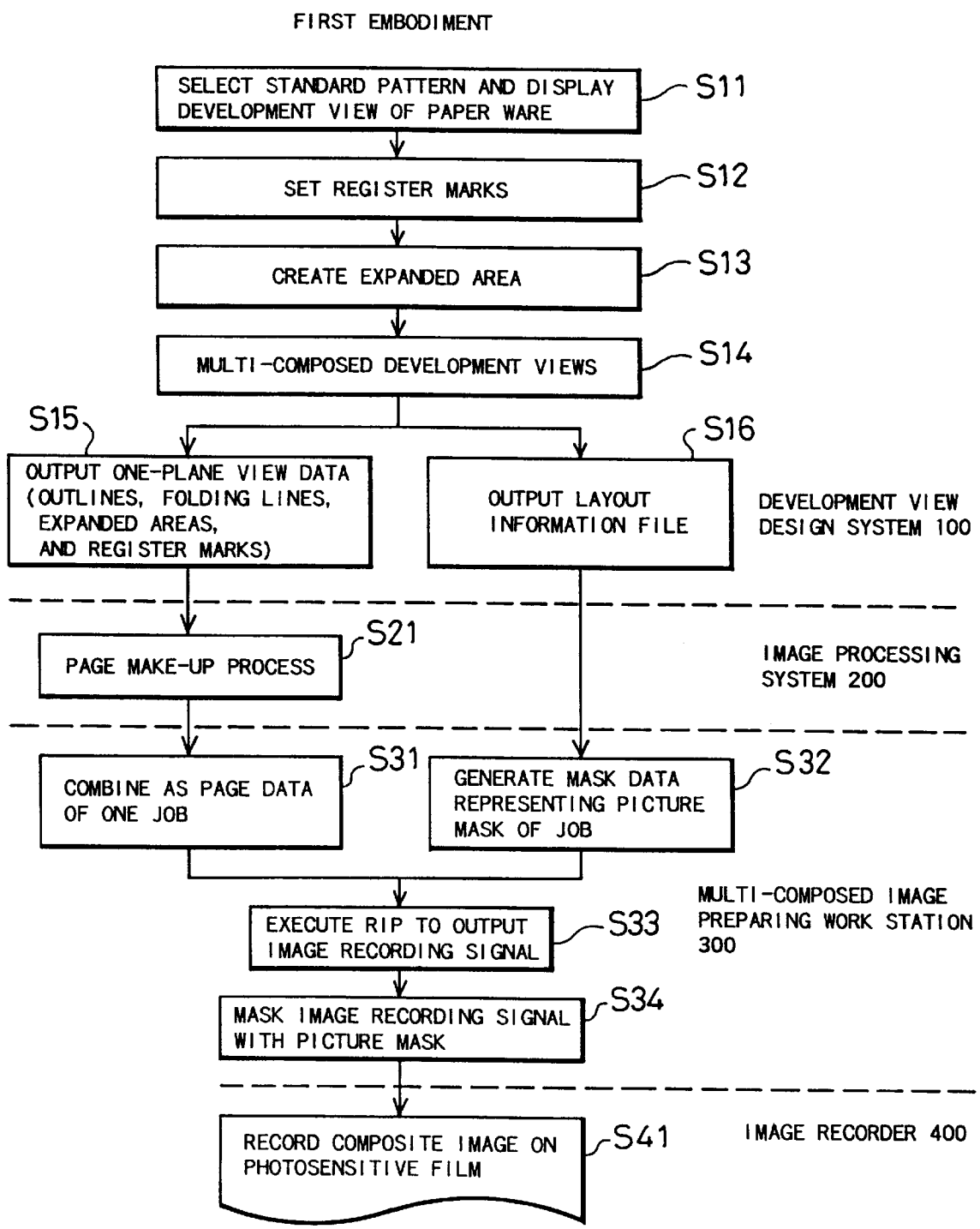
FIG. 3 is a flowchart showing a processing routine executed in a first embodiment.

FIG. 3 is a flowchart showing a processing routine executed in a first embodiment. Steps S11 through S16 in the flowchart of FIG. 3 are executed by the development view design system 100, step S21 by the image processing system 200, steps S31 through S34 by the multi-composed image preparing work station 300, and step S41 by the image recorder 400.

Figure 4:
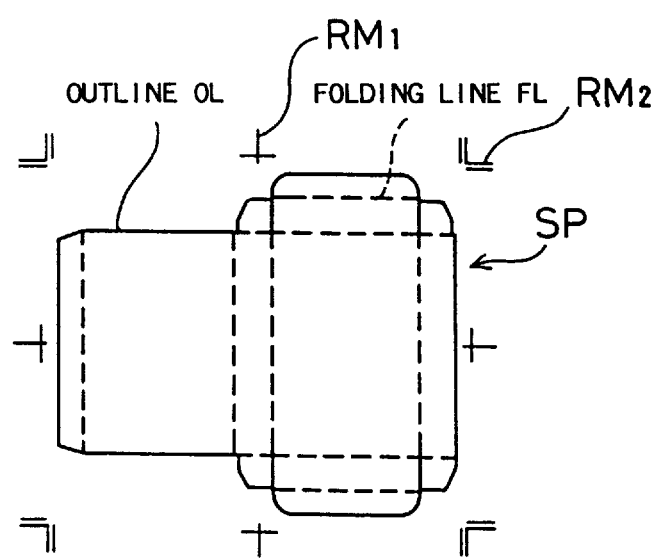
FIG. 4 shows a development view of a standard pattern SP.

When the program enters the routine, a user instructs to read out standard pattern data of a paper ware from the hard disk drive 112 with the mouse 108 at step S11. A development view expressed by the standard pattern data is displayed on the CRT 104 FIG. 4 shows a development view of a standard pattern SP displayed on the CRT 104. In FIG. 4, solid lines of the standard pattern SP represent a contour or outline OL of the paper ware and the broken lines represent folding lines FL of the paper ware. The folding lines FL may be drawn by solid lines if necessary. Different types of standard pattern data representing various shapes of paper packages are stored in the hard disk drive 112. When the user selects one among the several standard pattern data, the selected standard pattern data is displayed as shown in FIG. 4. The standard pattern data includes dimensions (size of each plane of the paper ware, width of each margin to fold, and radius of each corner section, etc.) and position of each part by variables.

When the user specifies actual dimensions of the respective parts of the standard pattern SP with the keyboard 106 and the mouse 108, the one-plane view data generating means 120 creates a development view of the paper ware according to the specified actual dimensions and displays the development view on the CRT 104.

At step S12, the register mark setting means 122 lays out register marks in the vicinity of the development view. Two different types of register marks RM1 and RM2, which are laid out in the vicinity of the development view SP, are shown in the example of FIG. 4. The first register marks RM1 are generally called 'center register mark'. The center register mark has a cross whose intersection is positioned at a substantial center in the vertical and horizontal directions of the development view SP. Each center register mark RM1 is disposed apart from the outline OL of the development view SP by a predetermined distance.

Figure 5A:
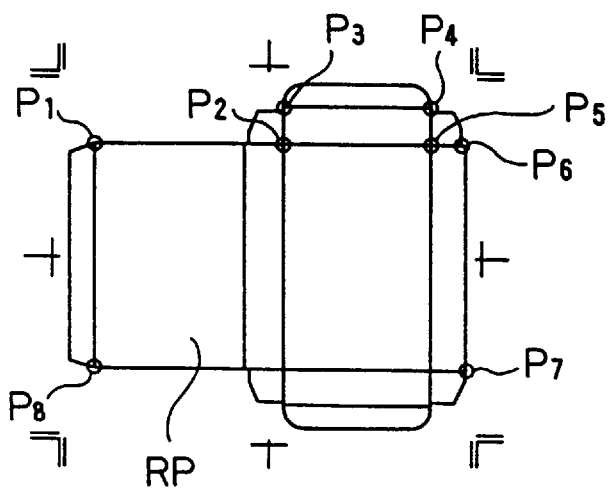
FIGS. 5A and 5B illustrate a concrete procedure of the expanded area generating process.
Figure 5B:
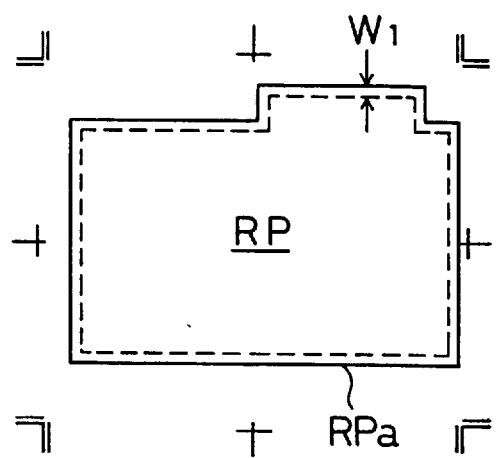

The program then proceeds to step S13, at which the expanded area generating means 126 creates a expanded area. The expanded area represents an area of each unit image, which is to be printed on the surface of one paper ware. FIGS. 5A and 5B illustrate a concrete procedure of the expanded area generating process. Referring to FIG. 5A, the user specifies positions of contour points P1 through P8 of a printing area RP with the mouse 108 while looking at the development view displayed on the CRT 104. The expanded area generating means 126 expands (or spreads) the periphery of the printing area RP by a desired width W1 as shown in FIG. 5B and generates data of an expanded printing area RPa (this data will be hereinafter simply referred to as 'expanded area data'). The user specifies the expanding width (spreading width) W1 with the keyboard 106. The expanding width W1 is generally determined in a range of 3 to 5 mm. In the printing process, a picture is printed in the expanded printing area RPa. The original printing area RP is expanded to give a expanded area in order to prevent a problem which would arise when actual cutting lines (die cutting lines) of the paper ware figure are deviated a little from the printed image area in cutting out the paper ware from the printed paper.

At step S13 in the flowchart of FIG. 3, another expanded area is prepared for the register marks RM1 and RM2. Namely the register marks RM1 and RM2 are expanded (or spread) by a predetermined width to yield expanded areas of the register marks. In the description below, the term 'expanded area' includes both the 'expanded area of the picture (unit image)' and the 'expanded area of the register marks'.

Figure 6:
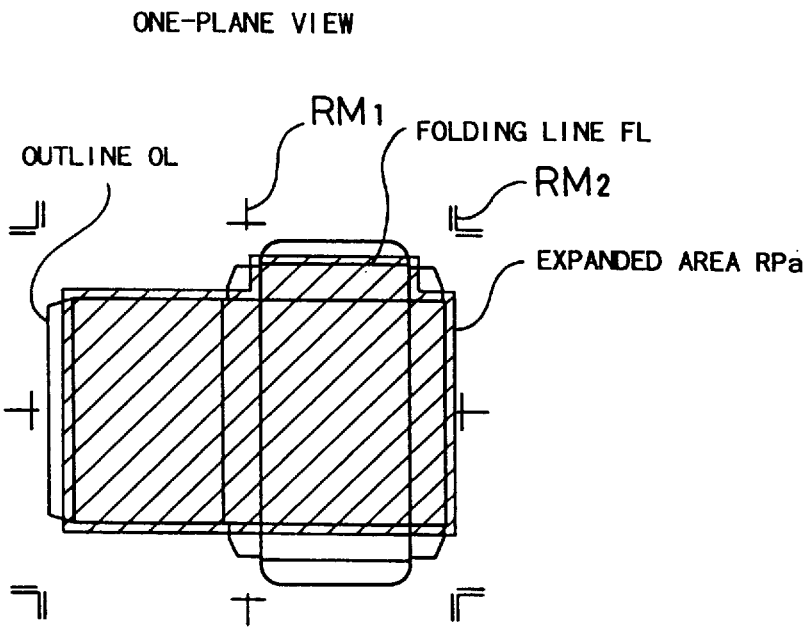
FIG. 6 shows a one-plane view as an example.

FIG. 6 shows a one-plane view including a expanded area. The one-plane view includes the development view of a paper ware drawn with outline OL and folding lines FL, the register marks RM1 and RM2, and the expanded area RPa. For the clarity of illustration, an area defined by the expanded area RPa is filled with slant lines in the example of FIG. 6. Although the expanded area actually includes expanded areas of the register marks RM1 and RM2 as discussed above, their illustration is omitted from the drawing of FIG. 6.

Figure 7:
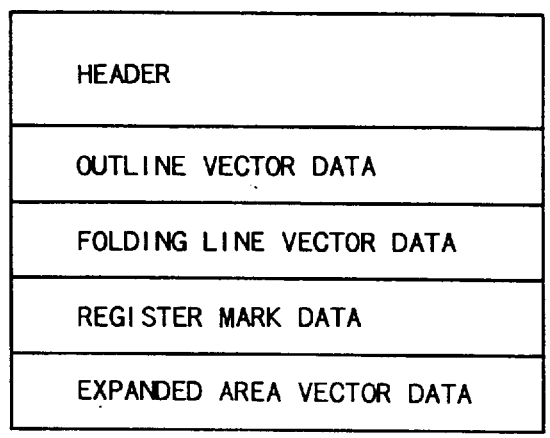
FIG. 7 shows the structure of one-plane view data.

FIG. 7 shows structure of one-plane view data. The one-plane view data are vector data representing the shape of the respective constituents of the one-plane view; that is, the outline OL, the folding lines FL, the register marks RM1 and RM2, and the expanded area RPa. The vector data representing the outline of the expanded area RPa are used as mask data representing an area of a unit image to be printed on the paper ware in the image output process described later.

Figure 8:
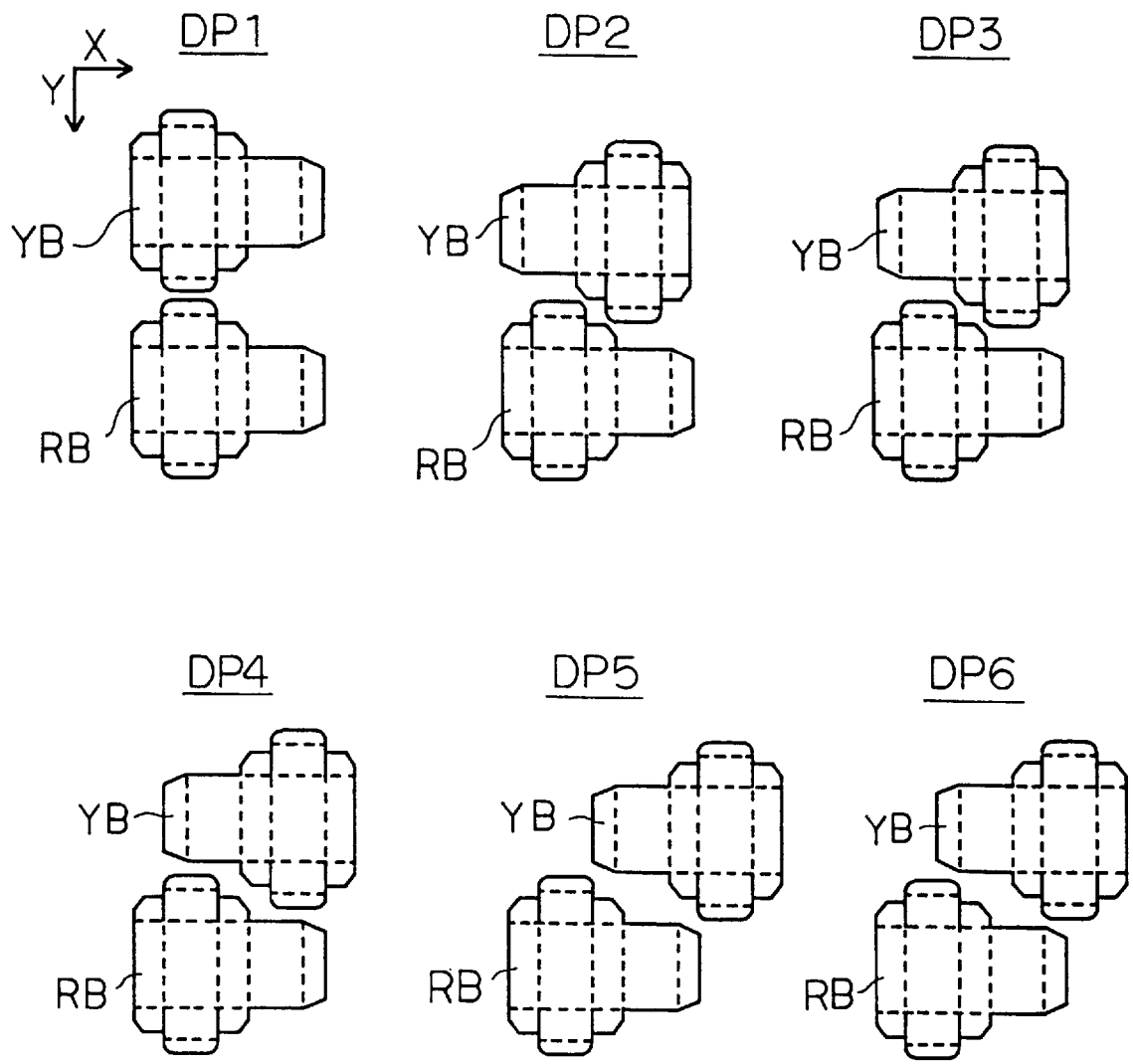
FIG. 8 shows a plurality of multi-composing patterns DP1 through DP6.

Referring back to the flowchart of FIG. 3, at step S14, the multi-composing means 124 (FIG. 2) lays out the development view of the paper ware on an image plane in a multi-composing pattern. A plurality of multi-composing patterns are stored in the hard disk drive 112, and a most efficient pattern is selected by an application program code. FIG. 8 shows a plurality of multi-composing patterns DP1 through DP6 stored in the hard disk drive 112. In each multi-composing pattern, the positional relationship between a reference box RB and a Y-adjoining box YB adjoining to the reference box RB in Y direction is defined as follows:

DP1 (normal configuration): The reference box RB and the Y-adjoining box YB are oriented in the same direction, and the left end side of the outline of the reference box RB is aligned with that of the Y-adjoining box YB.

DP2: The reference box RB and the Y-adjoining box YB are oriented in the reverse directions (DP3 through DP6 are also oriented in the reverse directions), and the left end side of the outline of the reference box RB is aligned with that of the Y-adjoining box YB.

DP3: The left end piece of the folding line of the reference box RB is aligned with that of the Y-adjoining box YB are aligned. The folding lines herein imply only vertical lines. In the drawing of FIG. 8, the folding lines are drawn with the broken lines.

DP4: The left end piece of the folding line of the reference box RB is aligned with the left end side of the outline of the Y-adjoining box YB.

DP5: The second piece of the folding lines from the left end of the reference box RB is aligned with the left end side of the outline of the Y-adjoining box YB.

DP6: The second piece of folding lines from the left end of the reference box RB is aligned with the left end piece of the folding line of the Y-adjoining box YB.

Horizontally inverted patterns of those shown in FIG. 8 are also available alternatives. Since the paper ware has a relatively complicated shape, selection of an appropriate pattern among a plurality of multi-composing patterns enables the image plane to be utilized at a higher efficiency.

Figure 9:
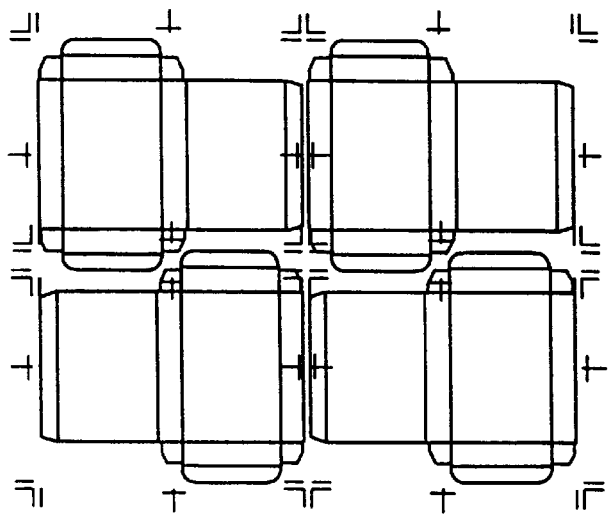
FIG. 9 illustrates multi-composed development views as an example.

The user selects one multi-composing pattern among these alternatives and specifies the numbers of paper wares arranged in the horizontal direction and in the vertical direction. The shape of the development view of the paper ware (including the outline OL, the folding lines FL, and the register marks RM1 and RM2) is then multi-composed according to the selected multi-composing pattern and the specified numbers of paper wares. FIG. 9 illustrates multi-composed development views as an example. The multi-composed development views of FIG. 9 are obtained by selecting a horizontally inverted pattern of the second multi-composing pattern DP2 and setting the numbers of paper wares arranged in the horizontal direction and in the vertical direction both equal to two.

Figure 10:
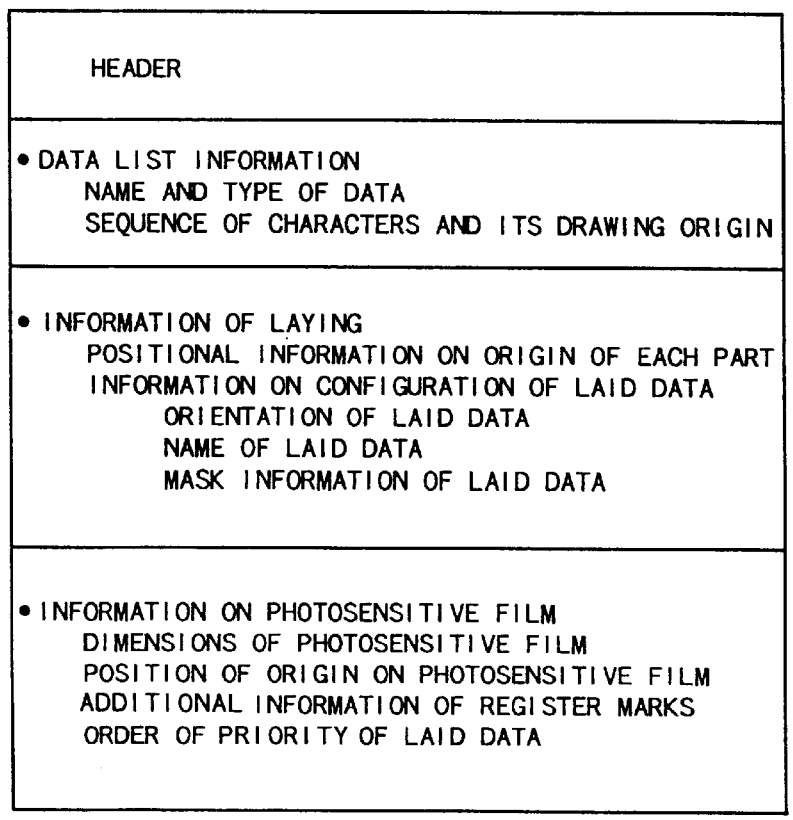
FIG. 10 shows the structure of a layout information file.

FIG. 10 shows the structure of a layout information file produced as a result of the multi-composing process. The layout information file includes data list information, of laying, and information of a photosensitive film. The data list information includes a name and a type of data representing each part laid out on an image plane as well as a sequence of characters and its drawing origin laid out on the image plane. The information of laying includes positional information of the origin of each part and information of the configuration of each part (orientation, name, and mask information). The information of a photosensitive film includes dimensions of the photosensitive film, the position of the origin on the photosensitive film, additional information of register marks, and the order of priority of laid out data (that is, priority of laid-out parts).

Referring back to the flowchart of FIG. 3, at step S15, the expanded area generating means 126 outputs the one-plane view data shown in FIG. 6 via the input/output means 128. By way of example, the one-plane view data are written into a floppy disk inserted in the floppy disk drive 110. The one-plane view data stored in the floppy disk are transferred to and read by the image processing system as shown in FIG. 1.

At step S16 in the flowchart of FIG. 3, the multi-composing means 124 outputs the layout information file via the input/output means 128. By way of example, the layout information file is written into a floppy disk inserted in the floppy disk drive 110. The layout information file stored in the floppy disk is transferred to and read by the multi-composed image preparing work station 300.

Figure 11:
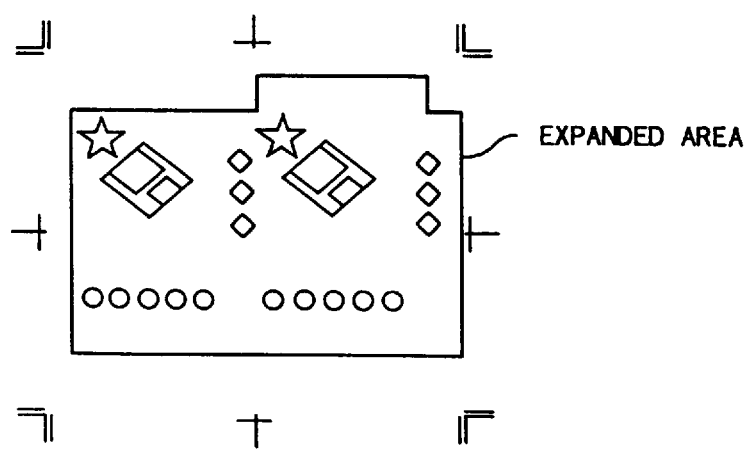
FIG. 11 illustrates a unit image produced by a page make-up process and displayed in an expanded area of the picture.

At step S21 in the flowchart of FIG. 3, the user carries out a page make-up process through the interactive operation with the image processing system 200. The page make-up process means to collect a variety of image parts including photographs, characters, and figures to generate a unit image in the expanded area of the picture. FIG. 11 illustrates a unit image (also referred to as 'picture') produced by the page make-up process and displayed in the expanded area of the picture.

Figure 12:
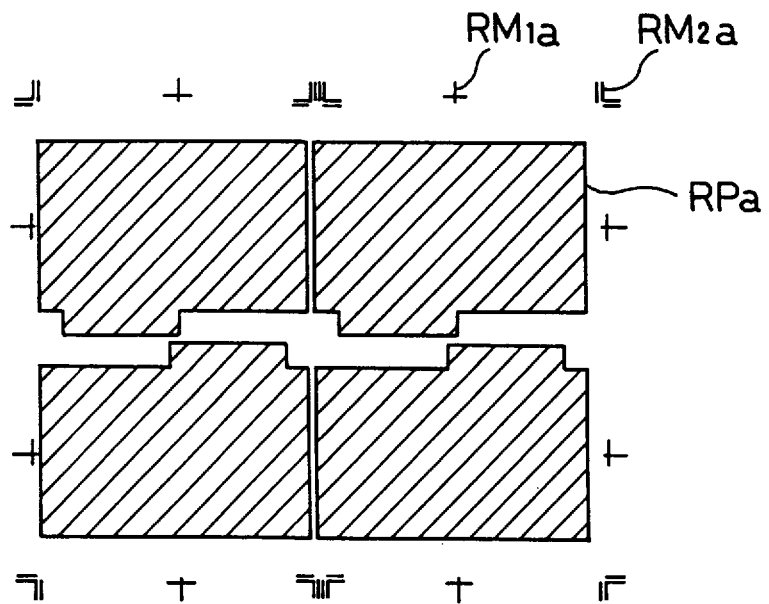
FIG. 12 shows a picture mask expressed by mask data.

The program then proceeds to step S31 in the flowchart of FIG. 3, at which the image data of the picture generated by the page make-up process and the one-plane view data are sent from the image processing system 200 to the multi-composed image preparing work station 300, and they are combined as page data of one job. The term 'job' herein implies a unit of operation executed at the multi-composed image preparing work station 300. At step S32, mask data representing a picture mask of the job are generated according to the layout information file and the one-plane view data. FIG. 12 shows a picture mask represented by the mask data. The picture mask (also referred to as 'image mask') is obtained by arranging a plurality of the expanded areas RPa of the picture and a plurality of the expanded areas RM1a and RM2b of the register marks according to the multi-composing layout defined by the layout information file. The picture mask shows mask areas in which the picture and the register marks are to be printed. Whereas the register marks RM1 and RM2 are arranged around one expanded area RPa of the picture in the one-plane view shown in FIG. 6, some expanded areas of the register marks are omitted from the picture mask in FIG. 12 at the positions overlapping with the expanded areas RPa of the picture. This prevents register marks from being undesirably printed in the picture. The area of the picture mask (also referred to as 'printable area') is determined by a logic operation given below:

[PMA]=[MCEAp] OR {[OA] AND [MCEAr]} where [PMA] denotes an picture mask area, [MCEAp] denotes the multi-composed expanded areas of the picture, [OA] denotes an area other than the multi-composed expanded areas of the picture, and [MCEAr] denotes the multi-composed expanded areas of the register marks.

Figure 13:
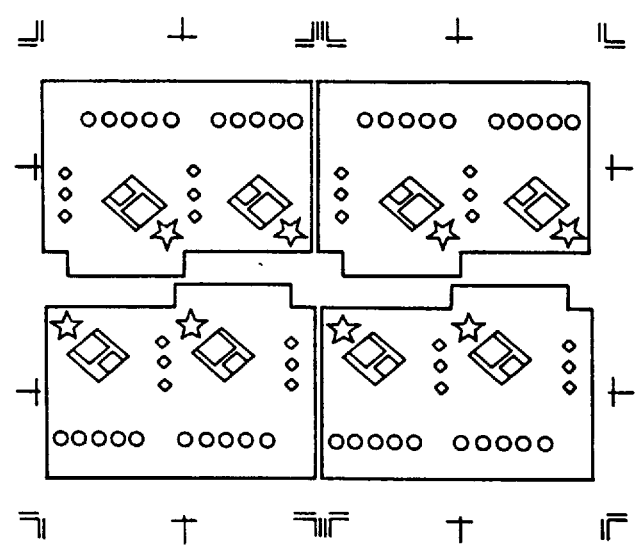
FIG. 13 illustrates pictures recorded in multi-composed expanded areas of the picture with register marks.

FIG. 13 illustrates pictures and register marks recorded according to the picture mask. Although lines representing the expanded areas are actually not recorded on the photosensitive material, FIG. 13 includes such lines as a matter of convenience of illustration. The outline and folding lines of each multi-composed development view are recorded independently of the picture mask. This means that the picture mask functions as only a mask for the picture and the register marks. The multi-composed image preparing work station 300 has a function of picture mask creating means for generating picture mask data representing an area in multi-composed development views, in which the pictures and the register marks are to be printed, based on the expanded areas of the picture and the expanded areas of the register marks included in the one-plane view and on the layout information included in the layout information file.

At step S33 in the flowchart of FIG. 3, the multi-composed image preparing work station 300 carries out Raster Image Processing according to the one-page data of the job (the one-plane view data and the picture image data) and the picture mask data, thereby generating an image recording signal which is used for recording a composite image including the multi-composed development views (outlines and folding lines) of the paper ware, the register marks, and the pictures. The image recording signal representing the pictures and the register marks is masked with the picture mask shown in FIG. 12 and supplied from the multi-composed image preparing work station 300 to the image recorder 400 at step S34. The image recording signal may be masked with the picture mask at the time of generating the image recording signal, instead of at the time of outputting the image recording signal.

At step S41, the image recorder 400 records the composite image onto a photosensitive film, based on the image recording signal output from the multi-composed image preparing work station 300. The composite image includes the pictures and the register marks drawn in the area defined by the picture mask (FIG. 12) as well as the outlines and the folding lines of the multi-composed development views.

As discussed above, the first embodiment generates and outputs an image recording signal representing a composite image including multi-composed pictures while using expanded areas as a picture mask and one picture image, thus not requiring image data representing the multi-composed pictures prepared in advance. Whereas the conventional method of generating image data representing multi-composed pictures requires a large capacity for storing large amounts of data, the method of the first embodiment can readily record multi-composed images as well as register marks according to the multi-composing layout without increasing the required capacity.

C. Second Embodiment

Figure 14:
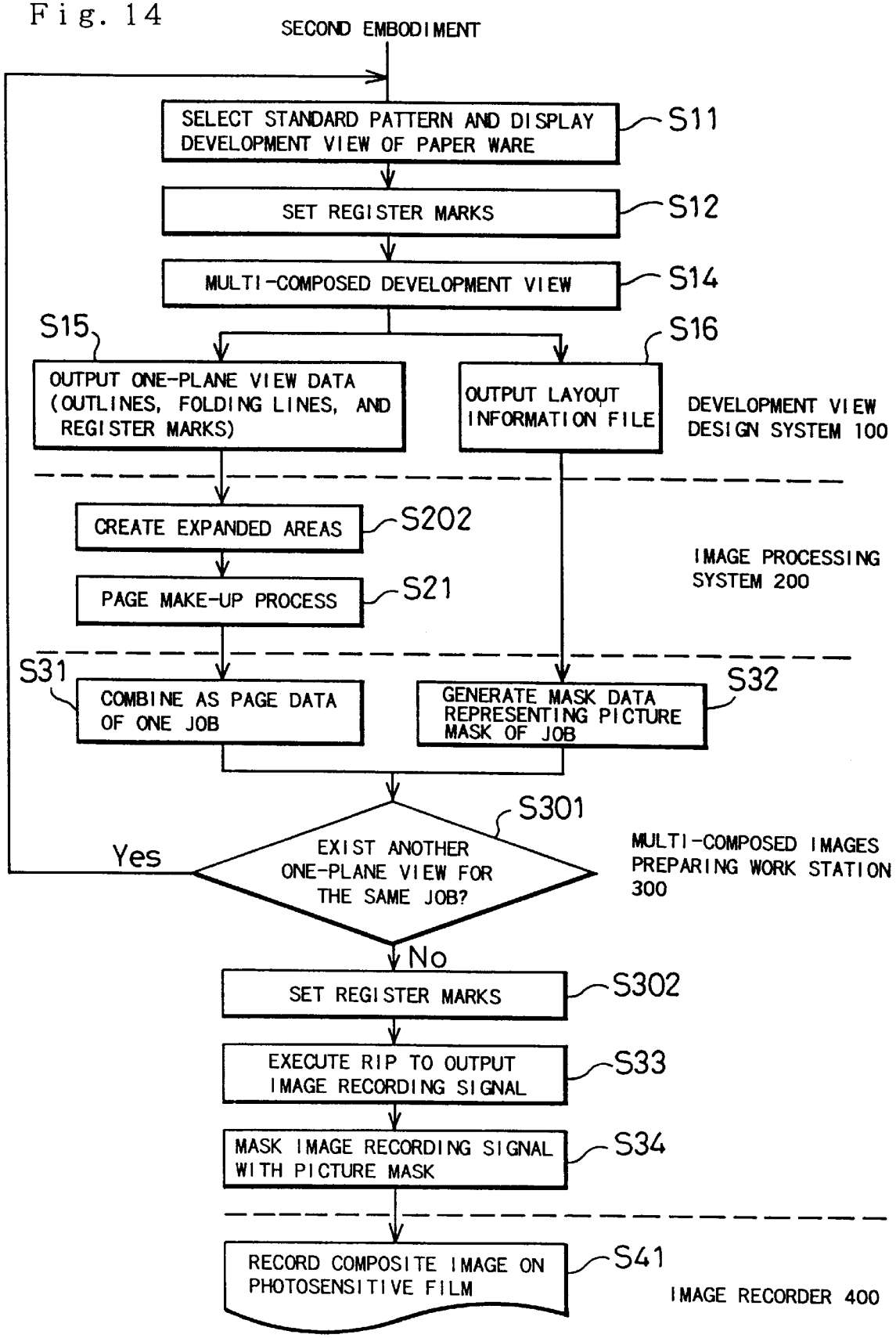
FIG. 14 is a flowchart showing a processing routine executed in a second embodiment of the present invention.

FIG. 14 is a flowchart showing a processing routine executed in a second embodiment of the present invention. In the processing routine of FIG. 14, the process of producing expanded areas (step S13) executed by the development view design system 100 in the first embodiment of FIG. 3 is carried out by the image processing system 200 at step S202 prior to the page make-up process (step S21). The register marks used in the multi-composing layout of the second embodiment are not those produced by the development view design system 100 but those laid out in the vicinity of the multi-composed development views by the multi-composed image preparing work station 300 at step S302 prior to the RIP (step S33). The process of preparing expanded areas and the process of laying register marks can be implemented in any of the development view design system 100, the image processing system 200, and the multi-composed image preparing work station 300. Namely the above distribution of the processes into the three systems 100, 200, and 300 is just for reasons of convenience, and any of the various processes described above can be carried out in any of the three systems 100, 200, and 300.

In the flowchart of FIG. 14, after the processing of steps S31 and S32, the program proceeds to step S301, at which it is judged whether or not another one-plane view exists for the same job. When existing, the program returns to step S11. This enables different paper wares to be prepared by the same job.

The above embodiments are only illustrative and not restrictive in any sense. There may be many modifications, changes, and alterations without departing from the spirit and scope of the main characteristics of the invention. Some examples of modification are given below.

Figure 15:
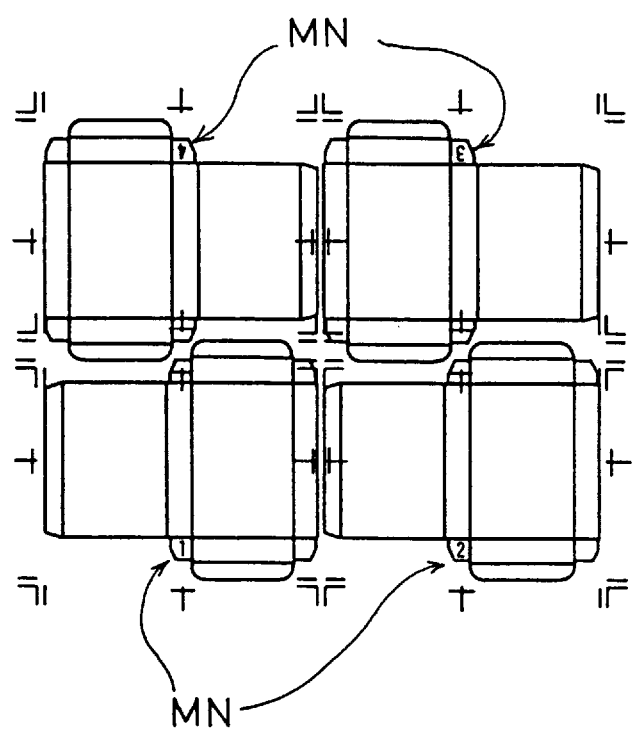
FIG. 15 shows multi-composed development views of a paper ware with management numbers allocated thereto.

(1) FIG. 15 shows multi-composed development views of a paper ware with management numbers allocated thereto. When a paper ware is printed in a multi-composing manner, it may be desirable to print consecutive numbers for management at unobservable locations in margins or bottoms of the multi-composed paper wares, in order to deal with the possible defects of the multi-composed paper wares. Management numbers MN shown in FIG. 15 are used as the consecutive numbers for management. When this method is applied to the above embodiments, the layout information file includes the positions, the font, and the character size of the management numbers. This enables the management numbers MN to be drawn at predetermined positions in multi-composed development views of the paper ware at the time of outputting a composite image.

(2) A plurality of images may be prepared in the page make-up process of step S21. In this case, the plurality of images are recorded in a multi-composing manner respectively at step S41.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of preparing an image recording signal representing multi-composed images through data processing by a computer which includes a pointing device and a display device having a display screen, by laying out identical images without the use of a photocomposer, said method comprising the steps of:

(a) specifying on said display screen with said pointing device a unit image area, in which a unit image is to be printed, to thereby generate unit image area data representing said unit image area;
  (b) generating unit image data representing said unit image within said unit image area;
  (c) laying out a plurality of copies of said unit image area on an image plane displayed on said display screen, to thereby generate layout information representing the layout of plurality of unit image areas;
  (d) preparing mask data representing said plurality of unit image areas, based on said unit image area data and said layout information; and
  (e) generating said image recording signal representing a plurality of unit images to be reproduced in said plurality of unit image areas on said image plane as a function of said mask data and said unit image data.

2. A method in accordance with claim 1, wherein said step (d) comprises the step of:
  preparing a register mark mask which is to be used in drawing a plurality of register marks at specific positions in the vicinity of each of said plurality of unit image areas so that said plurality of register marks do not overlap with said plurality of unit image areas; and
said step (e) comprises the step of:
  generating said image recording signal representing said plurality of register marks as well as said plurality of unit images.

3. A method in accordance with claim 1, further comprising the step of:
  (f) recording said plurality of unit images on a photosensitive material according to said image recording signal.

4. A method in accordance with claim 3, wherein said step (c) comprises the step of:
  preparing management number data as part of said layout information, said management number data representing different management numbers respectively drawn in the vicinity of said plurality of unit image areas; and
said step (f) comprises the step of:
  recording said management numbers respectively in the vicinity of said plurality of unit image areas according to said management number data.

* * * * *